US011210225B2

(12) United States Patent
Bavishi

(10) Patent No.: US 11,210,225 B2
(45) Date of Patent: Dec. 28, 2021

(54) PRE-FETCH FOR MEMORY SUB-SYSTEM WITH CACHE WHERE THE PRE-FETCH DOES NOT SEND DATA AND RESPONSE SIGNAL TO HOST

(71) Applicant: Micron Technology, Inc., Boise, ID (US)

(72) Inventor: Dhawal Bavishi, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/694,605

(22) Filed: Nov. 25, 2019

(65) Prior Publication Data

US 2021/0157733 A1 May 27, 2021

(51) Int. Cl.
 *G06F 12/0862* (2016.01)
(52) U.S. Cl.
 CPC .... *G06F 12/0862* (2013.01); *G06F 2212/313* (2013.01); *G06F 2212/602* (2013.01)

(58) Field of Classification Search
 CPC ............ G06F 12/0862; G06F 12/0866; G06F 3/0659; G06F 2212/602–6028
 See application file for complete search history.

(56) References Cited

U.S. PATENT DOCUMENTS

| | | | | |
|---|---|---|---|---|
| 5,961,631 A * | 10/1999 | Devereux | ............. | G06F 9/3877 712/207 |
| 2004/0123043 A1* | 6/2004 | Rotithor | .............. | G06F 12/0215 711/137 |
| 2005/0228955 A1* | 10/2005 | Day, III | .............. | G06F 12/0862 711/137 |
| 2014/0297965 A1* | 10/2014 | Jayaseelan | .............. | G06F 9/528 711/137 |

* cited by examiner

*Primary Examiner* — Chie Yew
(74) *Attorney, Agent, or Firm* — Schwegman Lundberg & Woessner, P.A.

(57) ABSTRACT

Various embodiments described herein provide for a pre-fetch operation on a memory sub-system, which can help avoid a cache miss when the memory sub-system subsequently processes a read command from a host system.

20 Claims, 11 Drawing Sheets

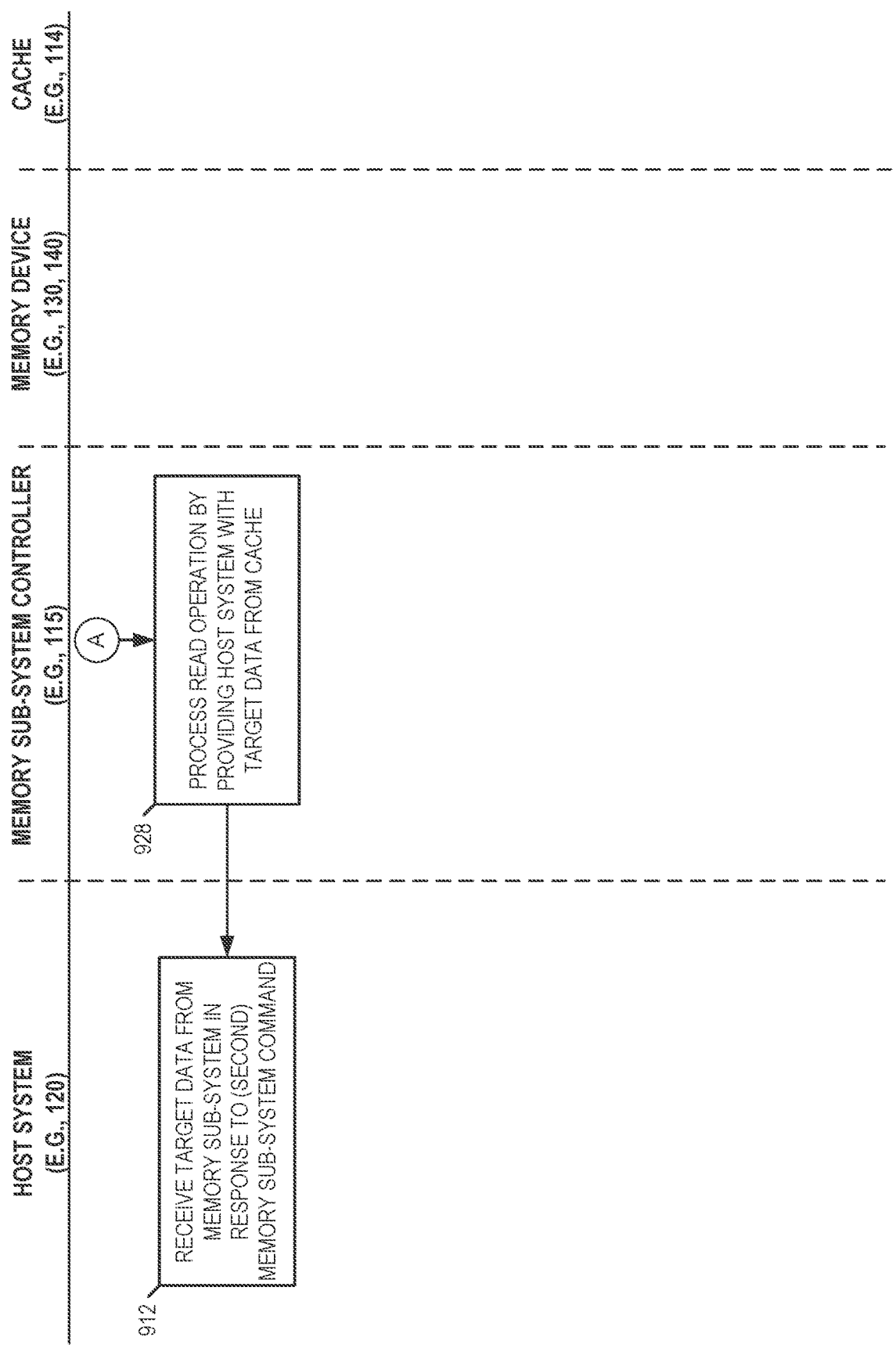

PRE-FETCH FOR MEMORY SUB-SYSTEM WITH CACHE WHERE THE PRE-FETCH DOES NOT SEND DATA AND RESPONSE SIGNAL TO HOST

TECHNICAL FIELD

Embodiments of the disclosure relate generally to memory sub-systems, and more specifically, relate to pre-fetching data to a cache of a memory sub-system.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 9A and 9B provide an interaction diagram illustrating interactions between components of the computing environment in the context of some embodiments in which a method for a pre-fetching operation on a memory sub-system is performed.

DETAILED DESCRIPTION

Figure 1:
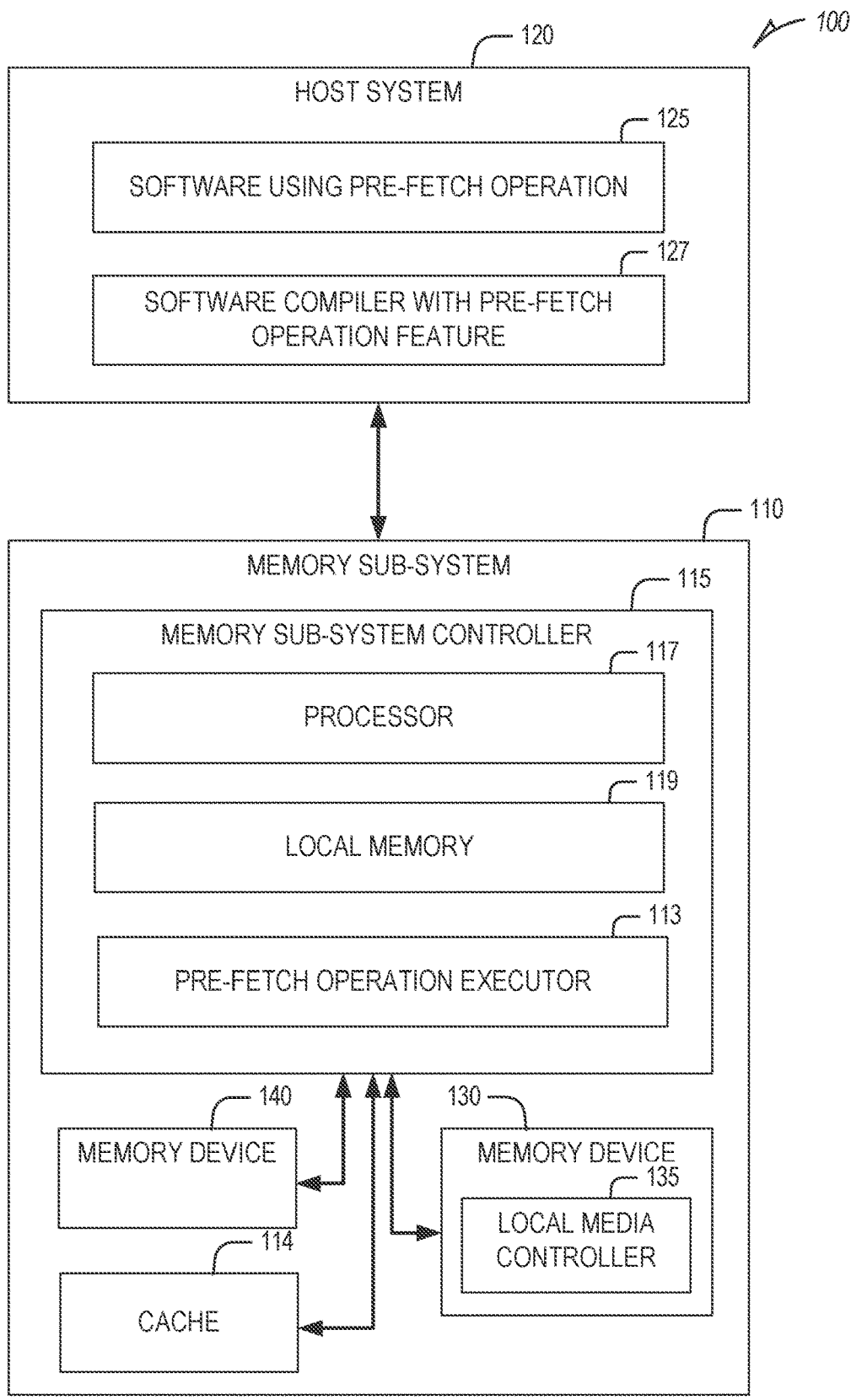
FIG. 1 illustrates an example computing environment that includes a memory sub-system in accordance with some embodiments of the present disclosure.

Aspects of the present disclosure are directed to pre-fetching data to a cache of a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices that store data. The host system can provide data to be stored at the memory sub-system and can request data to be retrieved from the memory sub-system.

A traditional memory sub-system can use an internal cache to speed up certain operations of the memory sub-systems (e.g., processing read requests from a host system), given that access operations (e.g., read or write operations) on the cache can be performed faster than on a memory device of the memory sub-system. Generally, when a conventional memory sub-system that includes a read cache receives a read request for target data (e.g., via a memory sub-system read command received from a host system), the memory sub-system first attempts to provide the target data from the read cache. If the target data is already stored in the cache, this can be referred to as a "cache hit" and the memory sub-system can provide the host system with the target data from the cache. However, if the target data is not already stored in the cache (e.g., due a prior operation), this can be referred to as a "cache miss" and the memory sub-system can respond by reading the target data from the memory device, storing the target data to the cache (e.g., copying the target data to the cache), and then providing the target data from the cache. Accordingly, a cache miss usually results in slower performance by the memory sub-system than when a cache hit occurs on the memory sub-system in response to a requested operation (e.g., requested read operation).

Aspects of the present disclosure address the above and other deficiencies by having a memory sub-system (e.g., non-volatile dual in-line memory module (NVDIMM) device) execute, by request of a host system, a pre-fetch operation that reads (e.g., pre-fetches) data from a given memory address (specified by the request) to a cache of the memory sub-system. For some embodiments, a pre-fetch operation is performed by a memory sub-system without the memory sub-system sending a response (e.g., feedback) back to a requesting host system in connection with the requested pre-fetch operation. For instance, according to some embodiments, after the pre-fetch operation is performed by the memory sub-system, the memory sub-system refrains from sending the host system a response regarding whether the pre-fetch operation request was received, a response regarding whether the pre-fetch operation successfully performed, or a response that includes the data read from the given memory address by the pre-fetch operation. Alternatively, for some embodiments, after the pre-fetch operation is performed by the memory sub-system, the memory sub-system can send a simple response that, for example, acknowledges receipt of the pre-fetch operation, indicates that the pre-fetch operation is complete, or comprises information specific to the pre-fetch operation (e.g., information that can be used by the host system or by the software requesting the pre-fetch operation). According to various embodiments, a pre-fetch operation can be used to preload the cache with data from the given memory address prior to (e.g., in advance of) the host system requesting execution of a read operation with respect to the same given memory address, thereby help avoid a cache miss when the requested read operation is subsequently performed by the memory sub-system. This can at least speed up performance of the memory sub-system with respect to executing read operations on the memory sub-system (if not also speed up other operations executed on the memory sub-system).

To request execution of a pre-fetch operation on a memory sub-system (as described herein), a host system can send a memory sub-system command of a memory protocol (e.g., a non-deterministic memory protocol, such as a Non-Volatile Dual In-Line Memory Module-P (NVDIMM-P) memory protocol) that facilitates requesting execution of a pre-fetch operation on the memory sub-system. For instance, the memory sub-system command can include one specifically associated with requesting a pre-fetch operation with respect to a given memory address. For example, the memory sub-system command can include: sending PREFETCH+SRCADDR on a command (CMD) signal line;

and sending, on a data (DQ) signal line, a value indicating an amount of data (e.g., data length, number of lines, etc.) to be pre-fetched from the source memory address (SR-CADDR). Alternatively, the memory sub-system command can include one that requests data be written to a specific destination memory address monitored for requesting pre-fetch operations, where the data includes a given memory address with which the pre-fetch operation is to be executed. For example, the memory sub-system command can include: sending XWRITE+DESTADDR on a command (CMD) signal line (e.g., NVDIMM-P XWRITE commands), where the DESTADDR includes the specific destination memory address; and sending, on a data (DQ) signal line, data that includes a source memory address with which the pre-fetched operation is to be performed and that further includes a value that indicates an amount of data (e.g., data length, number of lines, etc.) to be pre-fetched (e.g., starting) from the source memory address. The memory sub-system command, sent from a host system to a memory sub-system, can be generated by a software application (e.g., in user space) executing on the host system, an operating system executing on the host system, or a hardware component of the host system.

Disclosed herein are some examples of systems that can pre-fetch data to a cache of a memory sub-system, as described herein.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive. an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM). The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110, In some embodiments, the host system 120 is coupled to different types of memory sub-system 110. FIG. 1 illustrates one example of a host system 120 coupled to one memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory components such as 3D cross-point type and NAND type flash memory are described, the memory device 130 can be based on any other type of non-volatile memory, such as read-only memory (ROM), phase change memory (PCM), self-selecting memory, other chalcogenide based memories, ferroelectric random access memory (FeRAM), magneto random access memory (MRAM), negative-or (NOR) flash memory, electrically erasable programmable read-only memory (EEPROM), and a cross-point array of non-volatile memory cells.

One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130).

In some embodiments, a memory device 130 is a managed memory device, which is a raw memory device combined with a local controller (e.g., local controller 135) for media management within the same memory device package. An example of a managed memory device is a managed NAND (MNAND) device.

The host system 120 includes a software 125 using pre-fetch operation that enables or causes the generation of a request, at the host system, for a pre-fetch operation to be performed by the memory sub-system 110. The software 125 can include, or operate as, a pre-fetch predictor, which can request a pre-request operation after getting one or more hints from an operating system. The software 125 can represent (or form a part of) a user space software application or an operating system running on the host system 120. For instance, the software 125 can be implemented as a software layer of the host system 120, which can be a part of an operating system or a driver used by the host system 120 to interact (e.g., interface) with the memory sub-system 110. According to various embodiments, on the memory sub-system 110, the pre-fetch operation would read target data from a given memory address of the memory sub-system 110 (e.g., corresponding to a location on one of the memory devices 130, 140) and store the target data to the cache 114 of the memory sub-system 110, without the memory sub-system 110 sending a response to the host system 120 in connection with the pre-fetch operation (e.g., no NVDIMM-P response on the RSP_n signal line, and no data returned on the data (DQ) signal line). Alternatively, for some embodiments, after the pre-fetch operation is performed by the memory sub-system 110, the memory sub-system 110 can send a simple response to the host system 120 that, for example, acknowledges receipt of the pre-fetch operation, indicates that the pre-fetch operation is complete, or comprises information specific to the pre-fetch operation. Based on the request (generated by the software 125), the host system 120 can send to the memory sub-system 110 a memory sub-system command to perform the requested pre-fetch operation, where the memory sub-system command is associated with a non-deterministic memory protocol, such as a NVDIMM-P memory protocol. For some embodiments, the memory sub-system command includes a memory sub-system pre-fetch command that, according to a memory protocol (e.g., a non-deterministic memory protocol), is specifically associated with requesting performance of a pre-fetch operation on a memory sub-system. Alternatively, for some embodiments. the memory sub-system command includes a memory sub-system write command (e.g., of an existing non-deterministic memory protocol, such as a NVDIMM-P XWRITE command) to a designated memory address of the memory sub-system 110 that is associated with (e.g., monitor for) requesting pre-fetch operations on the memory sub-system 110.

Sometime after the request for the pre-fetch operation is generated, the software 125 can generate a request to perform a read operation with respect to the same given memory address of the memory sub-system and, based on that read request, the host system 120 can send to the memory sub-system 110 a memory sub-system command to perform the requested read operation. Eventually, the host system 120 receives, from the memory sub-system 110, target data from the given memory address in response to the memory sub-system read command. According to some embodiments, if the time between the memory sub-system 110 receiving the memory sub-system command for requesting a pre-fetch operation and the memory sub-system read command is sufficient for the memory sub-system 110 to complete performance of the pre-fetch operation prior to processing the memory sub-system read command, the target data being requested by the memory sub-system read command would already be stored (e.g., loaded) into the cache 114 (by the pre-fetch operation) by the time the memory sub-system processes the memory sub-system read command. Accordingly, a cache hit would result when the memory sub-system read command is processed by the memory sub-system 110, and the memory sub-system 110 would avoid the performance slowdown caused by a cache miss (which may have otherwise occurred if the pre-fetch operation had not been requested and completed prior to the memory sub-system read command).

The host system 120 includes a software compiler 127 with pre-fetch operation feature, which can generate the software 125 and cause the software 125 to include one or more instructions for requesting performance of a pre-fetch operation with respect to the memory sub-system 110. During generation of the instructions of the software 125, the software compiler 127 can, for example, detect a condition in the programming/coding of the software 125 and respond to the condition by optimizing instructions generated for the software 125 to include one or more instructions for requesting performance of a pre-fetch operation.

The memory sub-system 110 includes a cache 114 used for caching data during execution of operations of the memory sub-system 110, such a read operation or a write operation. The cache 114 can include one that is present at the frontend of the memory sub-system 110, while the memory devices 130, 140 can be present at the backend of the memory sub-system 110. Generally, the cache 114 has faster access performance than one or more of the memory devices (e.g., 130, 140) of the memory sub-system 110.

The memory sub-system 110 includes a pre-fetch operation executor 113 that enables or facilitates performance of a pre-fetch operation on the memory on the memory sub-system 110 in accordance with various embodiments. In some embodiments, the memory sub-system controller 115 includes at least a portion of the pre-fetch operation executor 113. For example, the memory sub-system controller 115 can include a processor 117 (processing device) configured to execute instructions stored in local memory 119 for performing the operations described herein. in some embodiments, the pre-fetch operation executor 113 is part of the host system 120, an application, or an operating system.

According to various embodiments, the pre-fetch operation executor 113 receives from the host system 120, a memory sub-system command to perform a pre-fetch operation that reads target data from a given memory address of the memory sub-system and stores the target data to the cache. The pre-fetch operation can be performed on the memory sub-system 110 without the memory sub-system 110 sending a response back to the host system 120 in connection with the pre-fetch operation. The memory sub-system command can be associated with a non-deterministic memory protocol and, as such, can be received from the host system 120 in accordance with the non-deterministic memory protocol (e.g., a NVDIMM-P memory protocol).

As described herein, for some embodiments, the memory sub-system command includes a memory sub-system pre-fetch command that is specifically associated with requesting performance of a pre-fetch operation on a memory sub-system. For instance, the memory sub-system command can include a command identifier (of a non-deterministic memory protocol) that is specifically associated with performing the pre-fetch operation, and the memory sub-system command further can further include command-related data (e.g., metadata) that includes the given memory address from which the pre-fetch operation will be read data. The command-related data can further include a value indicating an amount of data (e.g, length or number of lines) to be read from (e.g., starting from) the given memory address of the memory sub-system 110 and stored to the cache 114.

Alternatively, for some embodiments, the memory sub-system command includes a memory sub-system write command to a designated memory address of the memory sub-system 110 that is associated with (e.g., monitored for) requesting pre-fetch operations on the memory sub-system 110. For instance, the memory sub-system command can include a command identifier of the non-deterministic memory protocol associated with a write command, where the memory sub-system command further includes command-related data that comprises the given memory address and the memory sub-system command instructs the memory sub-system 110 to write the command-related data to the designated memory address (associated with performing the pre-fetch operation). The command-related data can further include a value indicating an amount of data to be read (e.g., starting) from the given memory address of the memory sub-system 110 and stored to the cache 114. According to some embodiments, the pre-fetch operation executor 113 monitors the designated memory address of the memory sub-system 110 to determine when new command-related data is stored to the designated memory address and, when new command-related data is detected, the pre-fetch operation executor 113 can perform the pre-fetch operation based on the new command-related data. The use of the memory sub-system write command in this way represents a posting-based methodology for implementing a memory sub-system command for requesting a pre-fetch operation. By using a memory sub-system write command, various embodiments can use a write command (e.g., XWRITE or PWRITE) of an existing memory protocol (e.g., an existing non-deterministic memory protocol) without need for expanding the memory protocol to include a new command for the pre-fetch operation.

In response to receiving the memory sub-system command to perform the pre-fetch operation, the pre-fetch operation executor 113 can determine whether to perform the pre-fetch operation. For example, determining whether to perform the pre-fetch operation can comprise determining whether the cache 114 is already storing valid/current data from the given memory address.

As another example, after the memory sub-system command is received by the memory sub-system 110, the pre-fetch operation executor 113 can assign a priority level to the pre-fetch operation, where the determination of whether to perform the pre-fetch operation comprises determining whether another priority level assigned to another pending operation (e.g., a pending non-prefetch operation) is lower than the priority level assigned to the pre-fetch operation. The other operation can be one requested (e.g., via a memory sub-system command from the host system 120) before or after the memory sub-system command to request the pre-fetch operation is received by the memory sub-system 110. Where the other priority level of the other pending operation is determined to be not higher than the priority level of the pre-fetch operation (e.g., the priority level of the other pending operation is lower than or equal to the priority level of the pre-fetch operation), the pre-fetch operation executor 113 can determine that the pre-fetch operation is to be performed. However, if the other priority level of the other pending operation is determined to be higher than the priority level of the pre-fetch operation (e.g., a high priority read operation is pending), the pre-fetch operation executor 113 can determine that the pre-fetch operation is not to be performed (at least at the time of the determination). The pre-fetch operation executor 113 can determine whether to perform the pre-fetch operation, for example, on a periodic basis or until the pre-fetch operation is canceled (e.g., in response to the other pending operation is a read operation to the same given memory address). For some embodiments, the assignment of the pre-fetch operation (and other operations) is facilitated through a cache controller coupled to the cache 114 of the memory sub-system 110. Additionally, assignment of priority levels to operations can be according to a user-defined configuration provided to the memory sub-system 110 (e.g., user preference that indicates that pre-fetch operations are to be assigned the highest priority level).

In response to determining that the pre-fetch operation is to be performed, the pre-fetch operation executor 113 can perform the pre-fetch operation by reading the target data, from a location on at least one of the memory devices 130, 140 that corresponds to the given memory address, and then storing the target data to the cache 114. In doing so, the pre-fetch operation can pre-load the cache 114 with the target data, which will help avoid a cache miss if and when the memory sub-system 110 receives and processes a subsequent memory sub-system read command that requests data from the same given memory address. For some embodiments, the pre-fetch operation executor 113 enables or causes a cache controller (not shown) of the memory sub-system 110 to read the target data from the given memory address of the memory sub-system 110 and store the target data to the cache 114 (e.g., at an appropriate location on the cache 114).

Further details with regards to the operations of the pre-fetch operation executor 113, the software compiler 127, and the software 125 are described below.

Figure 2:
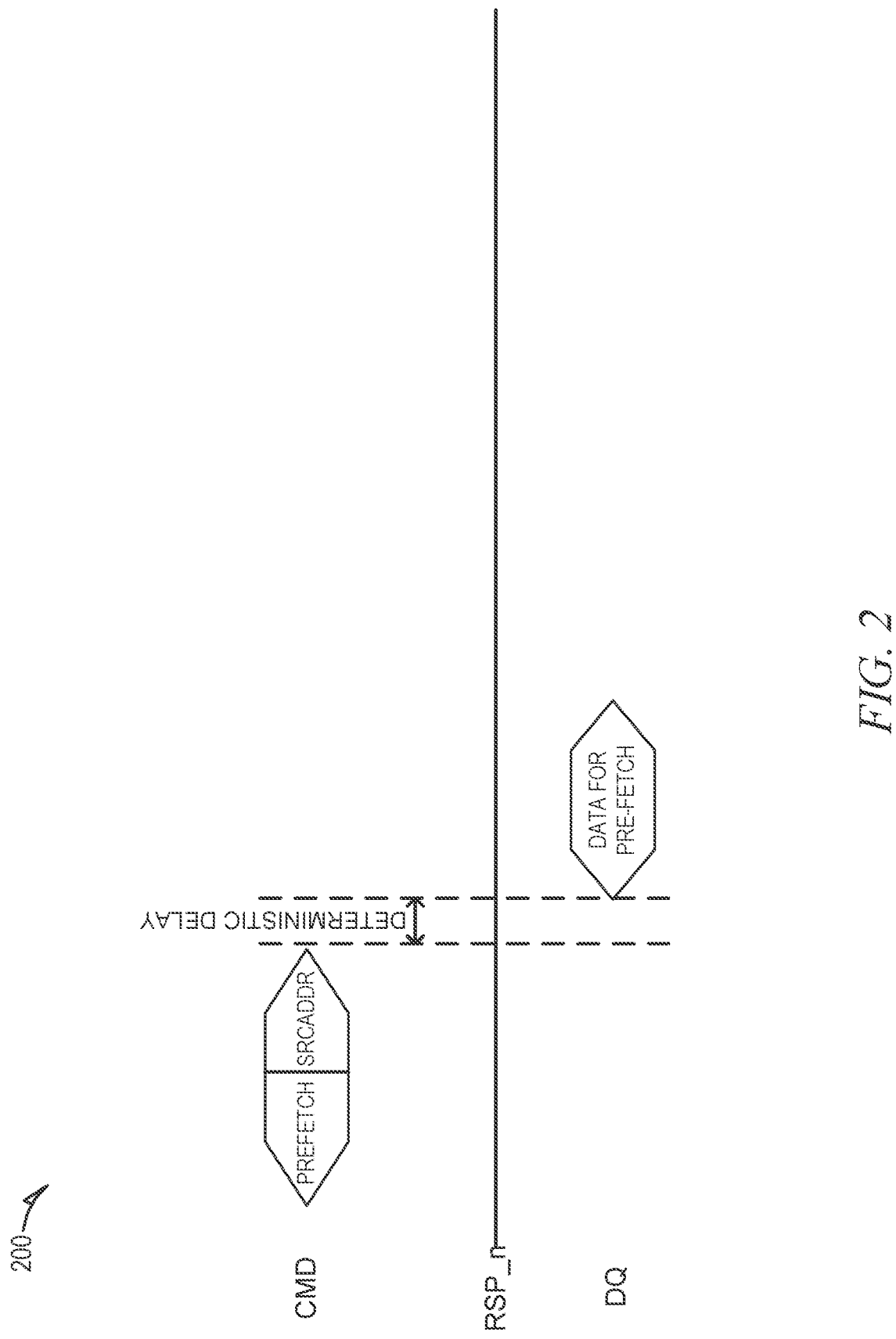
FIGS. 2 through 4 are diagrams illustrating example memory protocols by which a host system requests performance of a pre-fetch operation on a memory sub-system, in accordance with some embodiments of the present disclosure.
Figure 3:
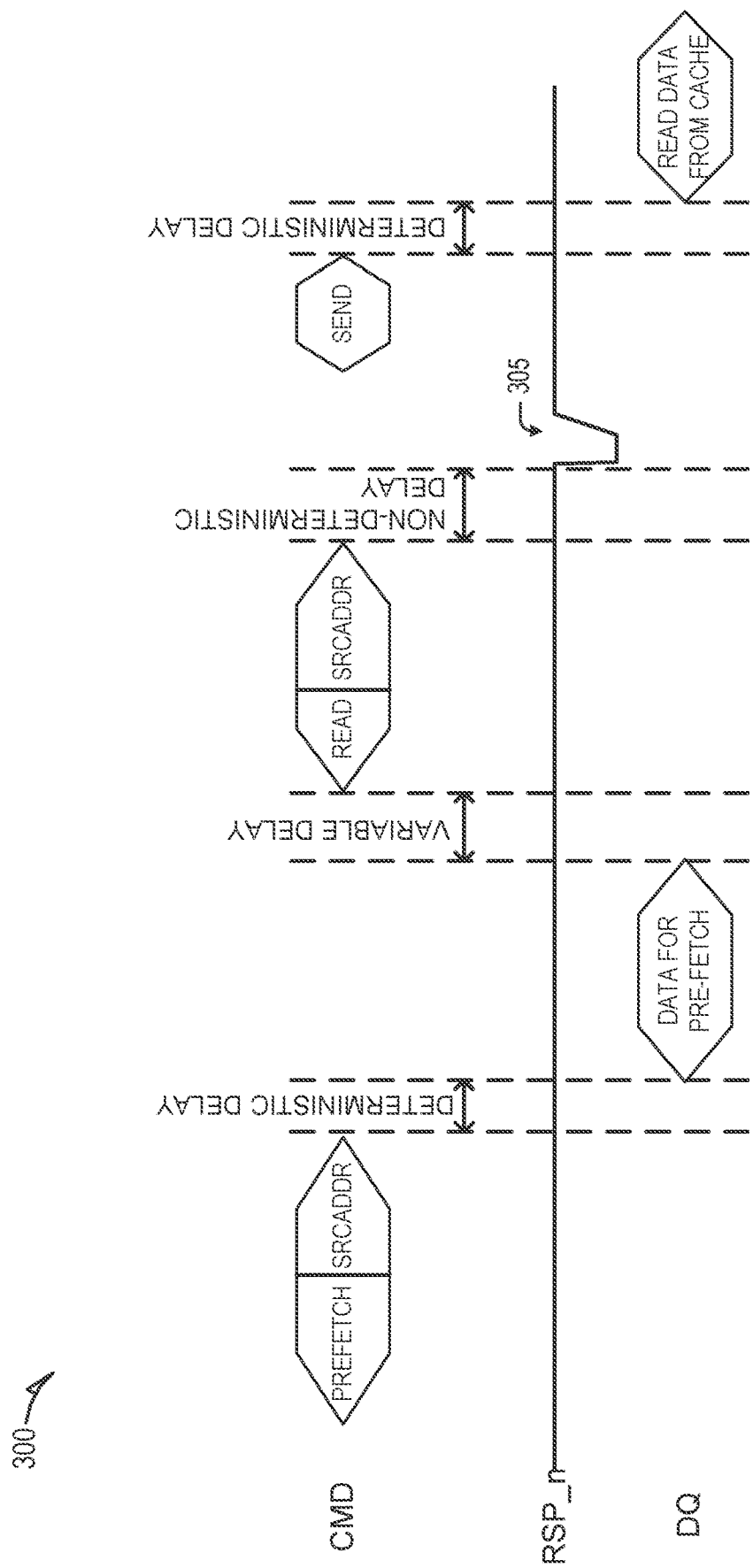
Figure 4:
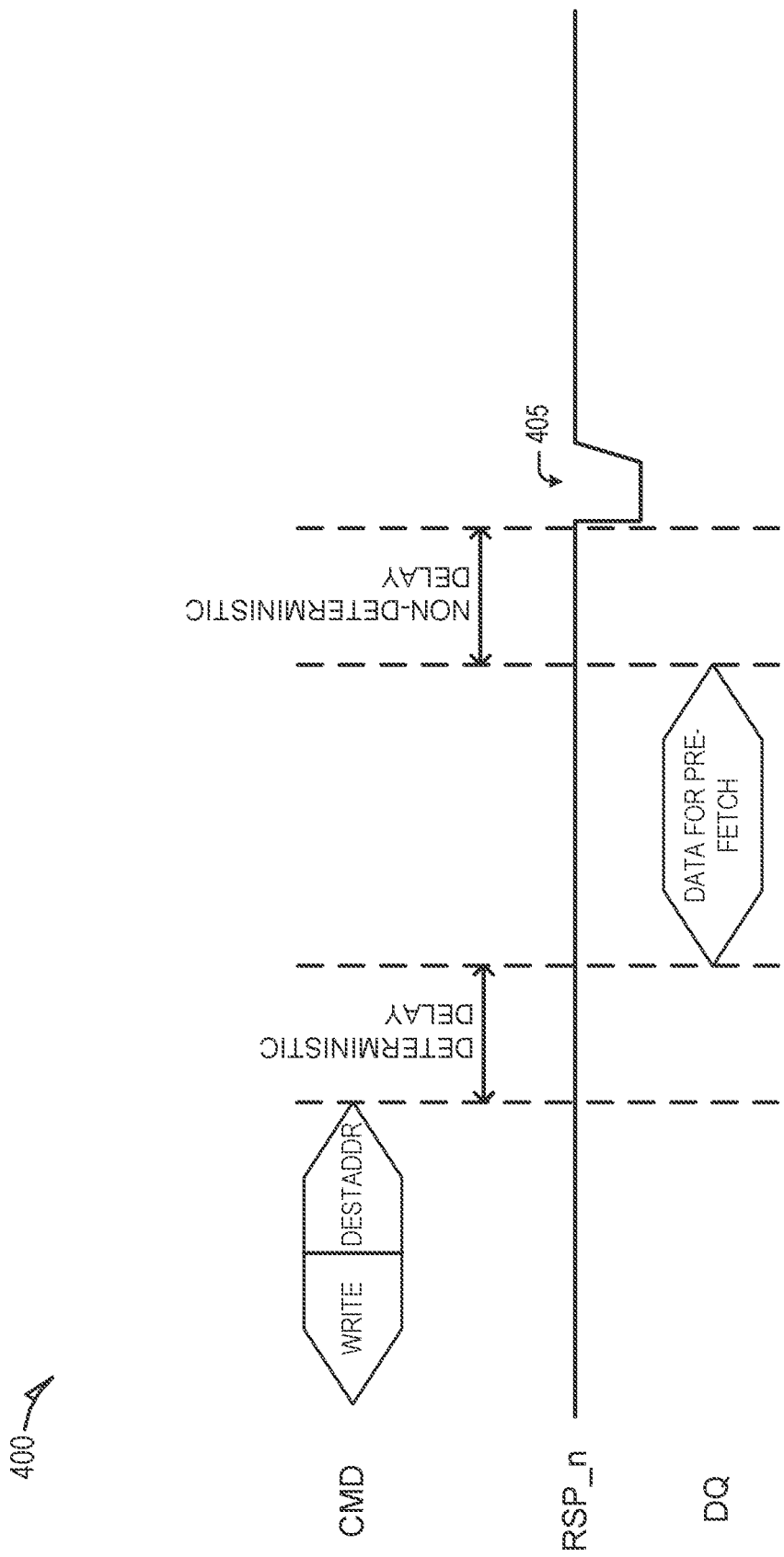

FIGS. 2 through 4 are diagrams illustrating example memory protocols by which a host system requests performance of a pre-fetch operation on a memory sub-system, in accordance with some embodiments of the present disclosure. FIG. 2 illustrates an example memory sub-system command, in accordance with an example NVDIMM-P memory protocol 200, by which a host system (e.g., 120) requests a memory sub-system (e.g., 110) to perform a pre-fetch operation on the memory sub-system. As shown, the requested pre-fetch operation involves a source memory address (SRCADDR), a command encoding (e.g., command identifier) corresponding to the requested pre-fetch operation (PREFETCH), and command-related data for performing the pre-fetch operation (DATA FOR PRE-FETCH). The pre-fetch operation is requested by a host system sending to the memory sub-system: command encoding corresponding to the pre-fetch operation (PREFETCH) and SRCADDR on a command (CMD) signal line; and DATA FOR PRE-FETCH on the data (DQ) signal line. The DATA FOR PRE-FETCH can be sent on the data (DQ) signal line after a deterministic delay that follows the sending of the command encoding (PREFETCH) and the SRCADDR on the command (CMD) signal line. The sending of the PREFETCH, SRCADDR, and DATA FOR PRE-FETCH via the CMD and DQ signal lines represent the sending of an example memory sub-system command to request a pre-fetch operation in accordance with the example NVDIMM-P memory protocol 200. The SRCADDR corresponds to a location on a memory device (e.g., 130, 140) of the memory sub-system from which the pre-fetch operation reads data, which the pre-fetch operation then stores on the cache of the memory sub-system. The DATA FOR PRE-FETCH can include data used by the pre-fetch operation, such as a value that indicates an amount of data (e.g., data length, number of lines, etc.) to be read from the SRCADDR (e.g., starting from the SRCADDR).

FIG. 3 illustrates an example memory sub-system command, in accordance with an example NVDIMM-P memory protocol 300, by which a host system (e.g., 120) requests a memory sub-system (e.g., 110) to perform a pre-fetch operation on the memory sub-system. Similar to FIG. 2, the requested pre-fetch operation involves a source memory address (SRCADDR) on a command (CMD) signal line, a command encoding (e.g., command identifier) corresponding to the requested pre-fetch operation (PREFETCH) on a command (CMD) signal line, and command-related data for performing the pre-fetch operation (DATA FOR PRE-FETCH) on a data (DQ) signal line.

As shown in FIG. 3, sometime (e.g., a variable delay) after the DATA FOR PRE-FETCH is sent on the data (DQ) signal line, the host system (e.g., 120) sends a memory sub-system read command (READ) to the memory sub-system on the command (CMD) signal line. As also shown, the memory sub-system read command (READ) is sent with the with the same SRCADDR as the what was sent with the memory sub-system read pre-fetch command (PREFETCH). After a non-deterministic delay, the memory sub-system responds to the memory sub-system read command (READ) with a signal 305 on the RSP_n signal line, which indicates to the host system that data requested by memory sub-system read command (READ) is ready to be sent from the memory subs-system to the host system. In response to the signal 305, the host system sends a memory sub-system send command (SEND) to the memory sub-system, which the memory sub-system responds to by sending the data from the cache (READ DATA FROM CACHE) back to the host system on the data (DQ) signal line after a deterministic delay. According to various embodiments, if the variable delay between sending the DATA FOR PRE-FETCH and the sending of the memory sub-system read command (READ) is sufficient enough for the pre-fetch operation to be completed by the memory sub-system, the target data being requested by the memory sub-system read command (READ) would already be stored (e.g., loaded) into the cache (by the pre-fetch operation) by the time the memory sub-system processes the memory sub-system read command (READ). Accordingly, a cache hit would result when the memory sub-system read command (READ) is processed by the memory sub-system, and the memory sub-system would avoid the performance slowdown caused by a cache miss (which may have otherwise occurred if the pre-fetch operation had not been requested and completed prior to the memory sub-system read command).

FIG. 4 illustrates an example memory sub-system command, in accordance with an example NVDIMM-P memory protocol 400, by which a host system (e.g., 120) requests a memory sub-system (e.g., 110) to perform a pre-fetch operation on the memory sub-system by way of a memory sub-system command. In comparison to FIGS. 2 and 3, FIG. 4 illustrates using a memory sub-system command to write (e.g., XWRITE or PWRITE command) to facilitate request of the pre-fetch operation. In particular, requesting the pre-fetch operation involves a command encoding (e.g., command identifier) corresponding to a write operation (WRITE), a destination memory address (DESTADDR), and command-related data for performing the pre-fetch operation (DATA FOR PRE-FETCH). The pre-fetch operation is requested by a host system sending to the memory sub-system: command encoding corresponding to a write operation (WRITE) and DESTADDR on a command (CMD) signal line; and DATA FOR PRE-FETCH on the data (DQ) signal line. The DATA FOR PRE-FETCH can be sent on the data (DQ) signal line after a deterministic delay that follows the sending of the command encoding (WRITE) and the DESTADDR on the command (CMD) signal line. The sending of the WRITE, DESTADDR, and DATA FOR PRE-FETCH via the CMD and DQ signal lines represent the sending of an example memory sub-system write command, in accordance with the example NVDIMM-P memory protocol 400, to request a pre-fetch operation. The DESTADDR corresponds to a location on a memory device (e.g., 130, 140) of the memory sub-system associated with (e.g., reserved for) performing a pre-fetch operation as described herein. For some embodiments, the location corresponding to the DESTADDR is monitored by the memory sub-system to determine whether new command-related data has been stored at (written to) the location and, in response to detecting storage of new command-related data, the memory sub-system performs a pre-fetch operation in accordance with the new command-related data. By using a memory sub-system write command in this way, the pre-fetch operation of various embodiments can be implemented with respect to a memory sub-system an existing memory protocol (e.g., existing non-deterministic memory protocol, such as a NVDIMM-P memory protocol), without need for expanding or modifying the existing memory protocol (e.g., to a add a new command to request the pre-fetch operation).

As shown in FIG. 4, the host system (e.g., 120) sends a memory sub-system write command (WRITE) with the DESTADDR to the memory sub-system on the command (CMD) signal line. The DATA FOR PRE-FETCH can be sent on the data (DQ) signal line after a deterministic delay that follows the sending of the command encoding (WRITE) and the DESTADDR on the command (CMD) signal line. The DATA FOR PRE-FETCH can include, for example, a source memory address (corresponding to a location on a memory device of the memory sub-system) from which the pre-fetch operation will read (e.g., pre-fetch) data. As described herein, the pre-fetch operation will store this read data to (e.g., load this data into) the cache of the memory sub-system. The DATA FOR PRE-FETCH can also include a value that indicates an amount of data (e.g., data length, number of lines, etc.) to be read (e.g., starting) from the source memory address. After a non-deterministic delay that follows the sending of the DATA FOR PRE-FETCH, the memory sub-system responds to the memory sub-system write command (WRITE) with a signal 405 on the RSP_n signal line, which indicates to the host system that the DATA FOR PRE-FETCH was successfully written to the DESTADDR. Subsequently, the memory sub-system will detect the new command-related data (the DATA FOR PRE-FETCH) stored to the DESTADDR, and perform (or attempt to perform) a pre-fetch operation accordingly.

Though not illustrated in FIG. 4, eventually (e.g., after a variable delay) the host system can send a memory sub-system read command, similar to what is illustrated with respect to FIG. 3. According to various embodiments, if the variable delay between sending the DATA FOR PRE-FETCH and the sending of the memory sub-system read command is sufficient enough for the pre-fetch operation to be completed by the memory sub-system, the target data being requested by the memory sub-system read command would already be stored (e.g., loaded) into the cache (by the pre-fetch operation) by the time the memory sub-system processes the memory sub-system read command. Accordingly, a cache hit would result when the memory sub-system read command is processed by the memory sub-system, and the memory sub-system would avoid the performance slow-down caused by a cache miss (which may have occurred if the pre-fetch operation had not been requested prior to the memory sub-system read command).

Figure 5:
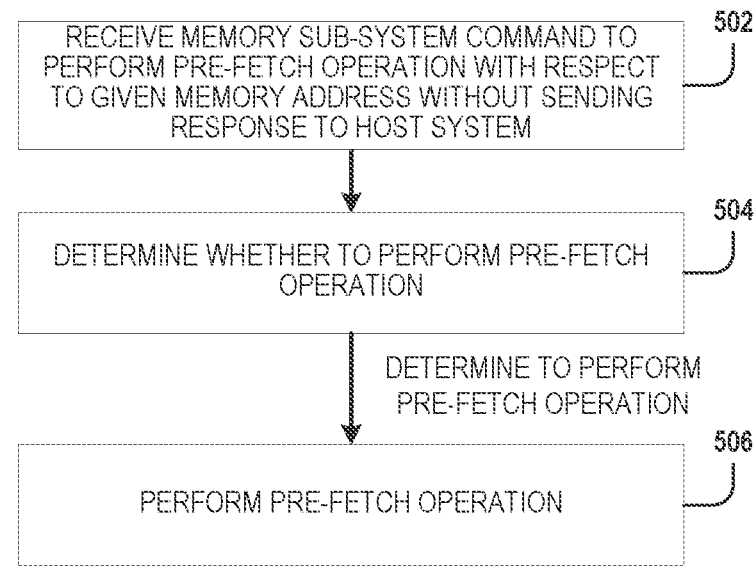
FIGS. 5 through 8 are flow diagrams of example methods for a pre-fetch operation on a memory sub-system, in accordance with some embodiments of the present disclosure.
Figure 8:
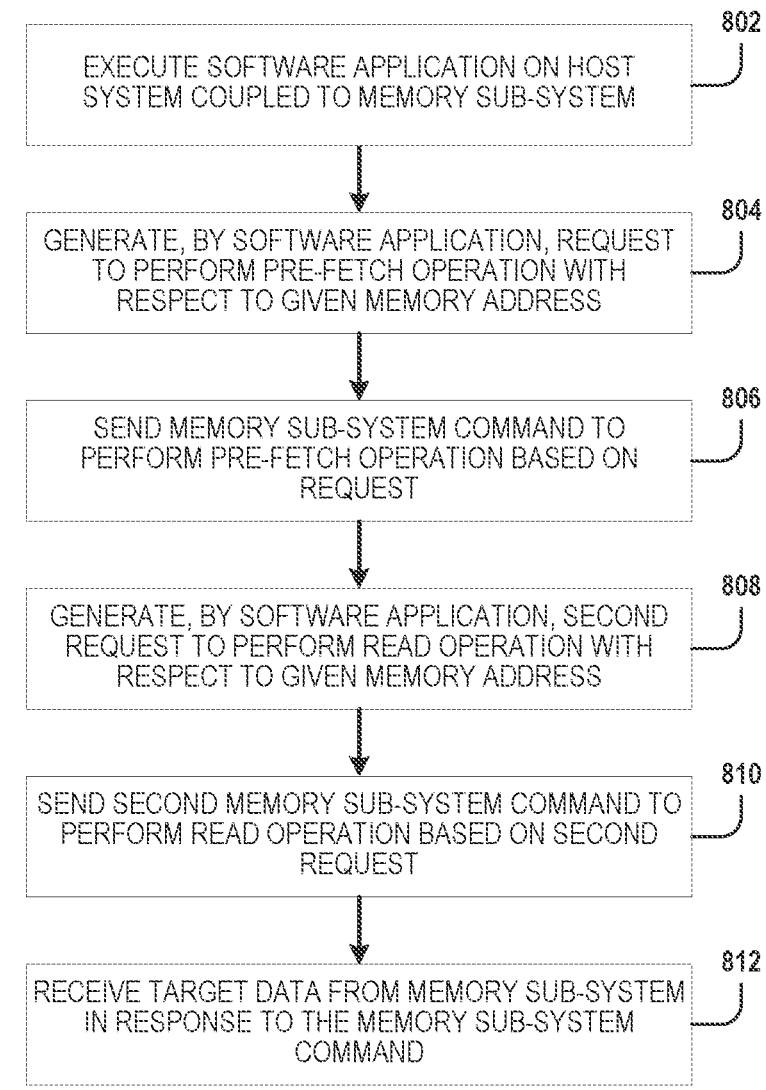

FIGS. 5 and 8 are flow diagrams of example methods for a pre-fetch operation on a memory sub-system, in accordance with some embodiments of the present disclosure. The methods 500, 600, 700, 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods 500, 600 are performed by the memory sub-system controller 115 of FIG. 1 based on the pre-fetch operation executor 113. Additionally, or alternatively, for some embodiments, the methods 500, 600 are performed, at least in part, by the host system 120. In some embodiments, the methods 700, 800 are performed by the host system 120 based on the software 125. Additionally, or alternatively, for some embodiments, the methods 700, 800 are performed, at least in part, by the memory sub-system controller 115 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now to the method 500 of FIG. 5, at operation 502, a processing device (e.g., of the memory sub-system controller 115) receives, from a host system (e.g., 120), a memory sub-system command to perform a pre-fetch operation that reads target data from a given memory address of the memory sub-system and stores the target data to a cache (e.g., 114) without sending a response to the host system in connection with the pre-fetch operation (e.g., no NVDIMM-P response on the RSP_n signal line, and no data returned on the data (DQ) signal line). Alternatively, for some embodiments, the pre-fetch operation causes the memory sub-system to read target data from a given memory address of the memory sub-system, store the target data to a cache (e.g., 114), and (afterwards) send a simple response (e.g., acknowledging receipt of the pre-fetch operation by NVDIMM-P response on the RSP_n signal line but no data returned on data (DQ) signal line). The memory sub-system command can be one associated with a non-deterministic memory protocol.

For some embodiments, the memory sub-system command comprises a command identifier of the non-deterministic memory protocol that is specifically associated with performing the pre-fetch operation. The memory sub-system command can include command-related data that comprises the given memory address, which can further comprise a value indicating an amount of data to be read (e.g., starting) from the given memory address of the memory sub-system and stored to the cache.

Additionally, for some embodiments, the memory sub-system command comprises a command identifier of the non-deterministic memory protocol that is associated with a write command. The memory sub-system command can include command-related data that comprises the given memory address, and that can further comprise a value indicating an amount of data to be read (e.g., starting) from the given memory address of the memory sub-system and stored to the cache.

For some embodiments, the memory sub-system command instructs the memory sub-system to write the command-related data to a designated memory address (of the memory sub-system) associated with performing the pre-fetch operation. Accordingly, for some embodiments, receiving the memory sub-system command to perform the pre-fetch operation comprises monitoring the designated memory address of the memory sub-system for new command-related data. Operations 504 and 506 can be performed in response to detecting that the new command-related data has been stored at the designated memory address.

At operation 504, the processing device (e.g., of the memory sub-system controller 115) determines whether to perform the pre-fetch operation. For example, determining whether to perform the pre-fetch operation can comprise determining whether the cache (e.g., 114) is already storing valid/current data from the given memory address. As another example, the determination of whether to perform the pre-fetch operation can comprise determining whether another priority level assigned to another pending operation (e.g. a pending non-prefetch operation) is lower than the priority level assigned to the pre-fetch operation.

In response to determining that the pre-fetch operation is to be performed (at operation 504), at operation 506, the processing device (e.g., of the memory sub-system controller 115) performs or causes the performance of the pre-fetch operation by reading the target data from a location on a set of memory devices (e.g., on the memory devices 130, 140) corresponding to the given memory address, and storing the target data to the cache. For some embodiments, the processing device causes performs or causes performance of the pre-fetch operation by way of a cache controller of the memory sub-system (e.g., 110). For example, the cache controller can read the target data from the location on the set of memory devices (e.g., 130, 140) and then store the target data to an appropriate location (e.g., one associated with the given memory address) on the cache (e.g., 114).

Figure 6:
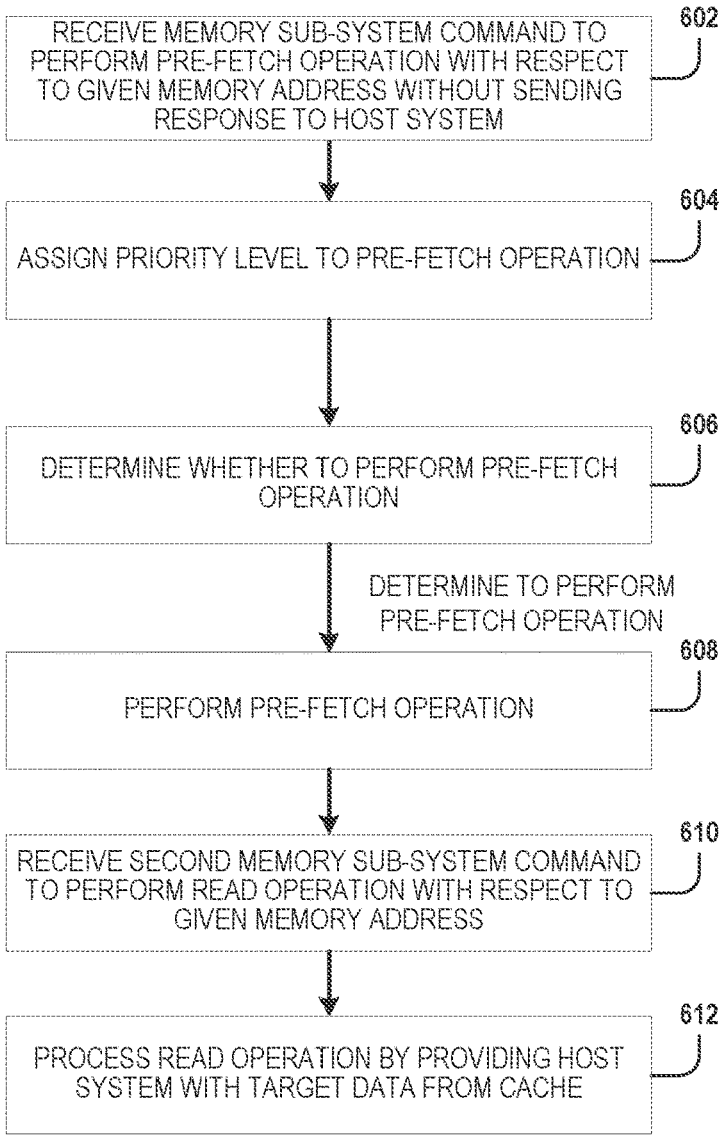

Referring now to the method 600 of FIG. 6, operation 602 is similar to operation 502 of the method 500 as described with respect to FIG. 5. At operation 604, the processing device (e.g., of the memory sub-system controller 115) assigns a first priority level to the pre-fetch operation after the memory sub-system command is received from the host system (e.g., 120) at operation 602. The pre-fetch operation can be assigned the first priority level according to, for example, a configuration (e.g., user preference or quality-of-service (QoS) setting data) of the memory sub-system (e.g., 110), which may map priority levels to operation type (e.g., assign pre-fetch operations the highest or lowest priority in comparison to read operations).

At operation 606, the processing device (e.g., of the memory sub-system controller 115) determines whether to perform the pre-fetch operation based on the first priority level assigned to the pre-fetch operation at operation 604. For some embodiments, the processing device makes this determination by determining whether a second priority level of a pending operation (e.g., a pending non-prefetch operation) is higher than the first priority level of the pre-fetch operation, and determining that the pre-fetch operation is to be performed in response to determining that the second priority level of the pending operation is not higher than (e.g., is lower than or equal to) the first priority level assigned to the pre-fetch operation at operation 604.

Alternatively, the processing device can defer performance of the pre-fetch operation in response to determining that the second priority level is higher than the first priority level. The pending operation can include an operation that was requested (e.g., via a memory sub-system command from the host system 120) after the pre-fetch operation requested by the memory sub-system command received at operation 602.

For some embodiments, operation 608 is similar to operation 506 of the method 500 as described with respect to FIG. 5.

At operation 610, the processing device (e.g., of the memory sub-system controller 115) receives, from the host system (e.g., 120), a memory sub-system command to perform a read operation with respect to the given memory address of the memory sub-system (the same given memory address of operation 602). For some embodiments, operation 606 includes determining whether the memory sub-system command to perform the read operation is received after the receiving the memory sub-system command to perform the pre-fetch operation but prior to the performing the pre-fetch operation. In response to determining that the memory sub-system command to perform the read operation is received after the receiving the memory sub-system command to perform the pre-fetch operation but prior to the performing the pre-fetch operation, the processing device can determine that the operation is not to be performed, and process the memory sub-system command to perform the read operation. The pre-fetch operation can be canceled (or preempted if already in process) in favor of processing the memory sub-system command to perform the read operation.

At operation 612, the processing device (e.g., of the memory sub-system controller 115) processes the read operation of the memory sub-system command to perform the read operation (received at operation 610) by providing the host system (e.g., 120) with the target data from the cache (e.g., 114). If the pre-fetch operation was successfully performed prior to the processing of the read operation, the read operation can be processed without experiencing a cache miss (in view of the pre-fetch operation storing the target data in advance of processing the read operation.

Figure 7:
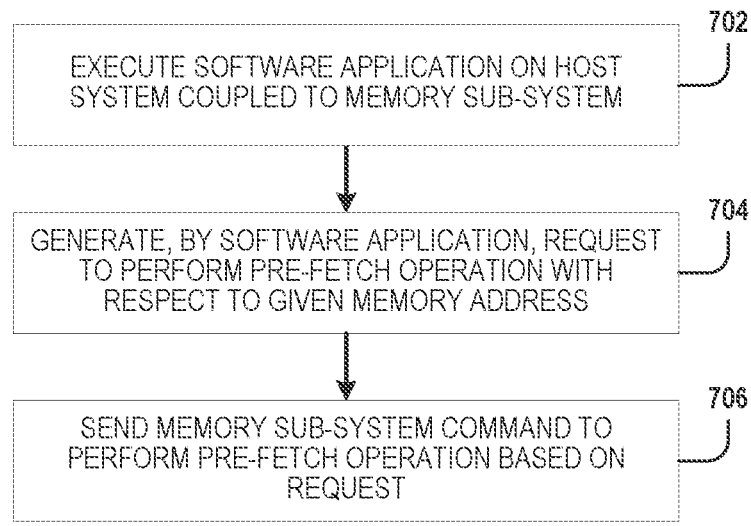

Referring now to the method 700 of FIG. 7, at operation 702, the processing device (e.g., of the host system 120) executes a software application (e.g., 125) on a host system (e.g., 120) that is coupled to a memory sub-system (e.g., 110). For various embodiment the software application comprises a set of instructions for generating the request for the pre-fetch operation. The software application can be generated, for example, by a software compiler (e.g., 127) that can cause the software application to include the set of instructions.

At operation 704, the processing device (e.g., of the host system 120) generates, by the software application (e.g., 125), a request to perform a pre-fetch operation that reads target data from a given memory address of the memory sub-system and stores the target data to a cache (e.g., 114) of the memory sub-system, without the memory sub-system (e.g., 110) sending a response to the host system in connection with the pre-fetch operation (e.g., no NVDIMM-P response on the RSP_n signal line, and no data returned on the data (DQ) signal line). At noted herein, alternatively, the pre-fetch operation can cause the memory sub-system (e.g., 110) to send a simple response (e.g., acknowledging receipt of the pre-fetch operation by NVDIMM-P response on the RSP_n signal line but no data returned on data (DQ) signal line) in connection with the pre-fetch operation.

At operation 706, the processing device (e.g., of the host system 120) sends, from the host system (e.g., 120) to the memory sub-system (e.g., 110), a memory sub-system command to perform the pre-fetch operation based on the request generated at operation 704. As described herein, the memory sub-system command can be associated with a non-deterministic memory protocol (e.g., a NVDIMM-P memory protocol) and, as such, the memory sub-system command can be sent from the host system (e.g., 120) to the memory sub-system (e.g., 110) in accordance with the non-deterministic memory protocol.

Referring now to the method 800 of FIG. 8, operations 802, 804, 806 are respectively similar to operations 702, 704, 706 of the method 700 as described with respect to FIG. 7. At operation 808, the processing device (e.g., of the host system 120) generates, by the software application (e.g., 125), a second request to perform a read operation with respect to the given memory address of the memory sub-system (e.g., 110).

At operation 810, the processing device (e.g., of the host system 120) sends, from the host system (e.g., 120) to the memory sub-system (e.g., 110), a memory sub-system command to perform the read operation based on the second request generated at operation 808. For some embodiments, the memory sub-system command to perform the read operation comprises a write command of an existing memory protocol (e.g., an existing non-deterministic memory protocol, such as a NVDIMM-P memory protocol).

At operation 812, the processing device (e.g., of the host system 120) receives the target data from the memory sub-system (e.g., 110) in response to the memory sub-system command sent at operation 810. For some embodiments, the target data is received from the memory sub-system (e.g., 110) in accordance with the non-deterministic memory protocol (e.g., a NVDIMM-P memory protocol). For some embodiments, the target data received from the memory sub-system (e.g., 110) is provided by the memory sub-system from the cache (e.g., 114) of the memory sub-system, where the target data was stored in the cache as a result of the pre-fetch operation (requested by the memory sub-system command sent at operation 806) being successfully performed by the memory sub-system (e.g., 110). Additionally, for some embodiments, the target data is received from the memory sub-system (e.g., 110) in accordance with a non-deterministic memory protocol, such as a NVDIMM memory protocol). For instance, the processing device (e.g., of the host system 120) can receive from the memory sub-system, a given response (e.g., a response on the RSP_n signal line) indicating that the target data is ready to be read from the memory sub-system. In response, the processing device (e.g., of the host system 120) can send, from the host system (e.g., 120) to the memory sub-system (e.g., 110), a memory sub-system command to perform a send operation. In response to the memory sub-system command to perform the send operation, the processing device (e.g., of the host system 120) can receive the target data from the memory sub-system (e.g., 110), where the memory sub-system provides the target data from the cache (e.g., 114). As described herein, the target data can be stored in the cache a result of the pre-fetch operation (requested by the memory sub-system command sent at operation 806) being successfully performed by the memory sub-system (e.g., 110).

Figure 9A:
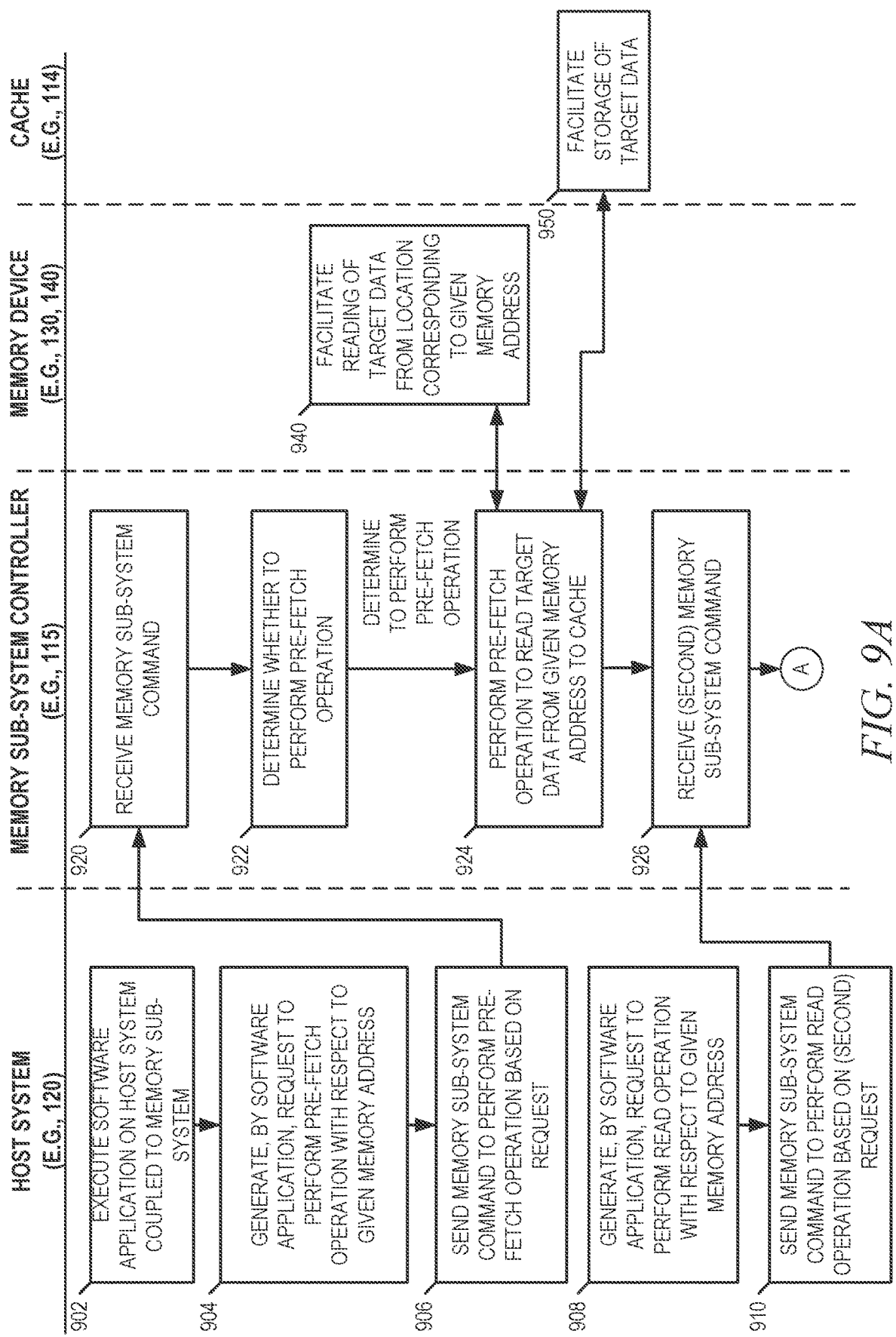

FIGS. 9A and 9B provide an interaction diagram illustrating interactions between components of the computing environment 100 in the context of some embodiments in which a method for a pre-fetch operation on a memory sub-system is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120), a memory sub-system controller (e.g., 115), a memory device (e.g., 130, 140), a cache (e.g., 114), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. In the context of the example illustrated in FIG. 9, the host system can include the host system 120, the memory sub-system controller can include the memory sub-system controller 115, the memory device can include the memory device 130 or 140, and the cache can include the cache 114.

As shown in FIG. 9A, at operation 902, the host system 120 executes a software application (e.g., 125) on the host system 120. At operation 904, the host system 120 generates, by the software application (executed by operation 902), a request to perform a pre-fetch operation that reads target data from a given memory address of the memory sub-system 110 and stores the target data to the cache 114, without the memory sub-system 110 sending a response to the host system in connection with the pre-fetch operation. At operation 906, the host system 120 sends to the memory sub-system 110 a memory sub-system command to perform the pre-fetch operation based on the request generated at operation 904.

At operation 920, the memory sub-system controller 115 receives, from the host system 120 the memory sub-system command to perform a pre-fetch operation. In response to the received memory sub-system command, at operation 922, the memory sub-system controller 115 determines whether to perform the pre-fetch operation. In response to determining that the pre-fetch operation is to be performed (at operation 922), at operation 924, the memory sub-system controller 115 performs of the pre-fetch operation by reading the target data from a location on at least one of the memory devices 130, 140 corresponding to the given memory address, and storing the target data to the cache 114. At operation 940, the at least one memory device facilitates reading of the target data from the location (corresponding to the given memory address) by operation 924. Additionally, at operation 950, the cache 114 facilitates storage of the target data on the cache 114 by operation 924.

Eventually, at operation 908, the host system 120 generates. by the software application (executed by operation 902), a request to perform a read operation with respect to the given memory address of the memory sub-system 110. At operation 910, the host system 120 sends to the memory sub-system 110 a memory sub-system command to perform the read operation based on the request generated at operation 908.

At operation 926, the memory sub-system controller 115 receives the memory sub-system command to perform the read operation with respect to the given memory address of the memory sub-system (the same given memory address of operation 904). Referring now to FIG. 9B, at operation 928, the memory sub-system controller 115 processes the read operation by providing the host system 120 with the target data from the cache 114, where the target data is stored on the cache 114 as a result of operation 924. At operation 912, the host system 120 receives the target data from the memory sub-system 110 in response to the memory sub-system command sent at operation 910.

Figure 10:
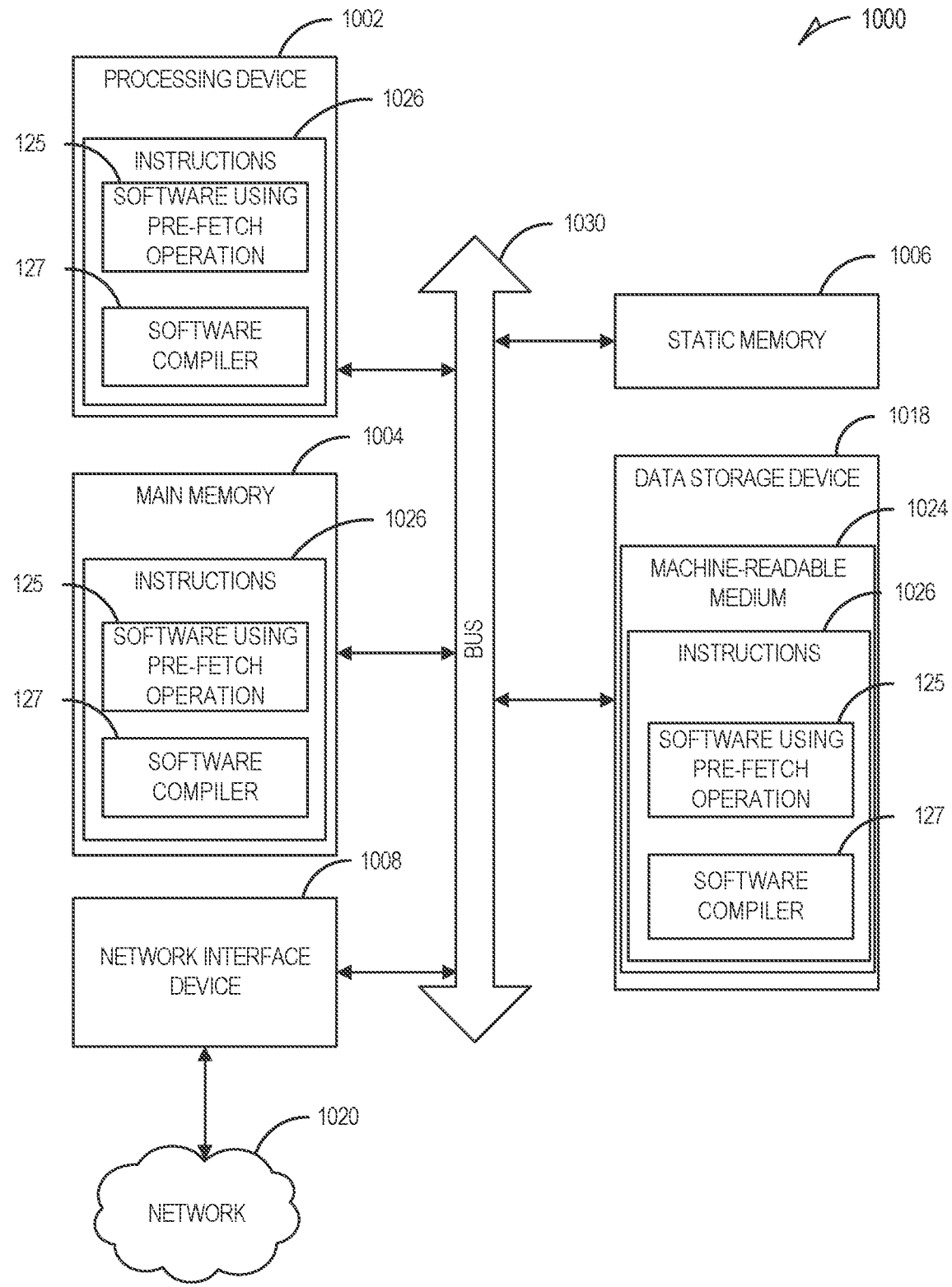
FIG. 10 is a block diagram of an example computer system in which embodiments of the present disclosure may operate.

FIG. 10 illustrates an example machine in the form of a computer system 1000 within which a set of instructions can be executed for causing the machine to perform any one or more of the methodologies discussed herein. In some embodiments, the computer system 1000 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the software 125 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030.

The processing device 1002 represents one or more general-purpose processing devices such as a microprocessor, a central processing unit, or the like. More particularly, the processing device 1002 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 1002 can also be one or more special-purpose processing devices such as an application specific integrated circuit (ASIC), a field programmable gate array (FPGA), a digital signal processor (DSP), a network processor, or the like. The processing device 1002 is configured to execute instructions 1026 for performing the operations and steps discussed herein. The computer system 1000 can further include a network interface device 1008 to communicate over a network 1020.

The data storage device 1018 can include a machine-readable storage medium 1024 (also known as a computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage device 1018, and/or main memory 1004 can correspond to the memory sub-system 110 of FIG. 1.

In one embodiment, the instructions 1026 include instructions to implement functionality corresponding to a pre-fetch operation on a memory sub-system as described herein (e.g., the software 125 of FIG. 1). While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory sub-system comprising:
   a set of memory devices;
   a cache; and
   a processing device, operatively coupled to the set of memory devices, configured to perform operations comprising:
      receiving, from a host system, a memory sub-system command to perform a pre-fetch operation that reads target data from a given memory address of the memory sub-system and stores the target data to the cache without sending, in connection with the pre-fetch operation, a response signal to the host system over a response signal line and data to the host system over a data signal line, each of the response signal line and the data signal line being coupled between the memory sub-system and the host system, the response signal line being separate from the data signal line, the memory sub-system command being associated with a non-deterministic memory protocol;
      determining whether to perform the pre-fetch operation; and
      in response to determining that the pre-fetch operation is to be performed, performing the pre-fetch operation by reading the target data from a location on the set of memory devices corresponding to the given memory address, and storing the target data to the cache.

2. The memory sub-system of claim 1, wherein the memory sub-system command comprises a command identifier of the non-deterministic memory protocol, the command identifier being specifically associated with performing the pre-fetch operation, the memory sub-system command further comprising command-related data that comprises the given memory address.

3. The memory sub-system of claim 2, wherein the command-related data further comprises a value indicating an amount of data to be read, starting from the given memory address of the memory sub-system, and stored to the cache.

4. The memory sub-system of claim 1, wherein the memory sub-system command comprises a command identifier of the non-deterministic memory protocol associated with a write command, the memory sub-system command further comprising command-related data that comprises the given memory address, the memory sub-system command instructing the memory sub-system to write the command-related data to a designated memory address of the memory sub-system that is associated with the pre-fetch operation.

5. The memory sub-system of claim 4, wherein the receiving the memory sub-system command to perform the pre-fetch operation comprises:
   monitoring the designated memory address of the memory sub-system for new command-related data, the determining whether to perform the pre-fetch operation and the performing the pre-fetch operation being performed in response to detecting that the new command-related data has been stored at the designated memory address.

6. The memory sub-system of claim 4, wherein the command-related data further comprises a value indicating an amount of data to be read, starting from the given memory address of the memory sub-system, and stored to the cache.

7. The memory sub-system of claim 1, wherein the operations further comprise:
   assigning a first priority level to the pre-fetch operation after the memory sub-system command is received from the host system, the determining whether to perform the pre-fetch operation comprising:
      determining whether a second priority level of a pending non-prefetch operation is higher than the first priority level of the pre-fetch operation; and
      determining that the pre-fetch operation is to be performed in response to determining that the second priority level is not higher than the first priority level.

8. The memory sub-system of claim 7, wherein the pending non-prefetch operation is requested after the pre-fetch operation.

9. The memory sub-system of claim 7, wherein the assigning the first priority level to the pre-fetch operation comprises assigning the first priority level to the pre-fetch operation according to at least one of user preference data or quality-of-service setting data accessible by the memory sub-system.

10. The memory sub-system of claim 1, wherein the operations further comprise:
    assigning a first priority level to the pre-fetch operation after the memory sub-system command is received from the host system, the determining whether to perform the pre-fetch operation comprising:
       determining whether a second priority level of a pending non-prefetch operation is lower than the first priority level of the pre-fetch operation; and
       deferring performance of the pre-fetch operation in response to determining that the second priority level is higher than the first priority level.

11. The memory sub-system of claim 1, wherein the operations further comprise:
    after the performing the pre-fetch operation:
       receiving, from the host system, a second memory sub-system command to perform a read operation with respect to the given memory address of the memory sub-system; and processing the read operation by providing the host system with the target data from the cache.

12. The memory sub-system of claim 1, wherein the operations further comprise:
receiving, from the host system, a second memory sub-system command to perform a read operation from the given memory address of the memory sub-system, the determining whether to perform the pre-fetch operation comprising:
determining whether the second memory sub-system command is received after the receiving the memory sub-system command to perform the pre-fetch operation but prior to the performing the pre-fetch operation; and
in response to determining that the second memory sub-system command is received after the receiving the memory sub-system command to perform the pre-fetch operation but prior to the performing the pre-fetch operation:
determining that the pre-fetch operation is not o be performed; and
processing the read operation.

13. The memory sub-system of claim 1, wherein the non-deterministic memory protocol comprises a Non-Volatile Dual In-Line Memory Module-P (NVDIMM-P) memory protocol.

14. A method comprising:
receiving, from a host system, a memory sub-system command to perform a pre-fetch operation that reads target data from a given memory address of a memory sub-system and. stores the target data to a cache of the memory sub-system without sending, in connection with the pre-fetch operation, a response signal to the host system over a response signal line and data to the host system over a data signal line, each of the response signal line and the data signal line being coupled between the memory sub-system and the host system the response signal line being separate from the data signal line, the memory sub-system command being associated with a non-deterministic memory protocol;
determining whether to perform the pre-fetch operation; and
in response to determining that the pre-fetch operation is to be performed, performing the pre-fetch operation by reading the target data from a location on a set of memory devices of the memory sub-system corresponding to the given memory address, and storing the target data to the cache.

15. The method of claim 14, wherein the memory sub-system command comprises a command identifier of the non-deterministic memory protocol, the command identifier being specifically associated with performing the pre-fetch operation, the memory sub-system command further comprising command-related data that comprises the given memory address.

16. The method of claim 14, wherein the memory sub-system command comprises a command identifier of the non-deterministic memory protocol associated with a write command, the memory sub-system command further comprising command-related data that comprises the given memory address, the memory sub-system command instructing the memory sub-system to write the command-related data to a designated memory address of the memory sub- system that is associated with the pre-fetch operation.

17. The method of claim 16, wherein the receiving the memory sub-system command to perform the pre-fetch operation comprises:
monitoring the designated memory address of the memory sub-system for new command-related data, the determining whether to perform the pre-fetch operation and the performing the pre-fetch operation being performed in response to detecting that the new command-related data has been stored at the designated memory address.

18. The method of claim 16, wherein the command-related data further comprises a value indicating an amount of data to be read, starting from the given memory address of the memory sub-system, and stored to the cache.

19. A non-transitory computer-readable storage medium comprising instructions that, when executed by a processing device of a memory sub-system, cause the processing device to perform operations comprising:
receiving, from a host system, a memory sub-system command to perform a pre-fetch operation that reads target data from a given memory address of the memory sub-system and stores the target data to cache of the memory sub-system, without sending, in connection with the pre-fetch operation, a response signal to the host system over a response signal line and data to the host system over a data signal line, each of the response signal line and the data signal line being coupled between the memory sub-system and the host system, the response signal line being separate from the data signal line, the memory sub-system command being associated with a non-deterministic memory protocol; and
in response to receiving the memory sub-system command, performing the pre-fetch operation by reading the target data, from a location on a set of memory devices of the memory sub-system corresponding to the given memory address, and storing the target data to the cache.

20. A method comprising:
generating, by a software application, a request to perform a pre-fetch operation that reads target data from a given memory address of a memory sub-system and stores the target data to a cache of the memory sub-system, without the memory sub-system sending, in connection with the pre-fetch operation, a response signal to a host system over a response signal line and data to the host system over a data signal line, each of the response signal line and the data signal line being coupled between the memory sub-system and the host system, the response signal line being separate from the data signal line: and
sending, from the host system to the memory sub-system, a memory sub-system command. to perform the pre-fetch operation based on the request, the memory sub-system command being associated with a non-deterministic memory protocol.

* * * * *

UNITED STATES PATENT AND TRADEMARK OFFICE
CERTIFICATE OF CORRECTION

PATENT NO. : 11,210,225 B2  
APPLICATION NO. : 16/694605  
DATED : December 28, 2021  
INVENTOR(S) : Bavishi Page 1 of 1

It is certified that error appears in the above-identified patent and that said Letters Patent is hereby corrected as shown below:

In the Claims

In Column 20, Line 1, in Claim 3, delete "he" and insert --be-- therefor

In Column 21, Line 20, in Claim 12, delete "o" and insert --to-- therefor

In Column 21, Line 31, in Claim 14, delete "and." and insert --and-- therefor

In Column 21, Line 37, in Claim 14, delete "system" and insert --system,-- therefor In Column 22, Line 3, in Claim 16, delete "sub- system" and insert --sub-system-- therefor In Column 22, Line 54, in Claim 20, delete "line:" and insert --line;-- therefor In Column 22, Line 56, in Claim 20, delete "command." and insert --command-- therefor Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*